United States Patent
Chan et al.

(10) Patent No.: US 11,412,302 B2
(45) Date of Patent: Aug. 9, 2022

(54) DETECTION CIRCUIT AND WAKE-UP METHOD

(71) Applicant: REALTEK SEMICONDUCTOR CORP., Hsinchu (TW)

(72) Inventors: Chun-Chieh Chan, Hsinchu (TW); Ming-An Wu, Hsinchu (TW); Chia-Hao Chang, Hsinchu (TW); Chien-Hsun Lu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/367,460

(22) Filed: Jul. 5, 2021

(65) Prior Publication Data

US 2022/0109908 A1 Apr. 7, 2022

(30) Foreign Application Priority Data

Oct. 7, 2020 (TW) ................................. 109134706

(51) Int. Cl.
*H04N 21/443* (2011.01)
*H04N 21/442* (2011.01)
*H04N 5/63* (2006.01)
*H04N 21/4363* (2011.01)

(52) U.S. Cl.
CPC ........... *H04N 21/4436* (2013.01); *H04N 5/63* (2013.01); *H04N 21/43635* (2013.01); *H04N 21/4424* (2013.01); *G09G 2370/12* (2013.01)

(58) Field of Classification Search
CPC .............. H04N 21/4436; H04N 5/63; H04N 21/43635; H04N 21/4424; G09G 2370/12
See application file for complete search history.

(56) References Cited

U.S. PATENT DOCUMENTS

| 9,749,940 | B2 * | 8/2017 | Jung | .................... H04W 8/005 |
| 2002/0031086 | A1 | 3/2002 | Welin | |
| 2009/0116547 | A1 | 5/2009 | Lida et al. | |
| 2016/0374021 | A1 * | 12/2016 | Alpman | ............ H04W 52/0229 |
| 2018/0103229 | A1 * | 4/2018 | Yang | ................ H04N 21/42204 |

FOREIGN PATENT DOCUMENTS

| TW | 201442500 A | 11/2014 | |
| TW | 201919365 A | 5/2019 | |
| WO | WO-2017151925 A1 * | 9/2017 | ............... G06F 3/14 |
| WO | WO-2019125920 A1 * | 6/2019 | ............. G06F 3/162 |

* cited by examiner

*Primary Examiner* — Farley Abad
(74) *Attorney, Agent, or Firm* — Li & Cai Intellectual Property (USA) Office

(57) ABSTRACT

A detection circuit and a wake-up method are provided. The detection circuit is adapted to a high definition multimedia interface (HDMI) receiver that enters a power-saving mode in a fixed rate link (FRL) mode to detect whether or not an HDMI transmitter starts to transmit video packets through the FRL. The detection circuit includes a signal detection circuit detecting whether or not signal exists on the FRL and an FRL packet determination circuit determining whether or not the FRL packets are the video packets according to a variable value characteristic of the video packets and/or a fixed value characteristic of gap packets. An existence of the signal on the FRL indicates an existence of FRL packets on the FRL. When the FRL packets are the video packets, the FRL packet determination circuit wakes the HDMI receiver from the power-saving mode to resolve the video packets and display videos.

20 Claims, 5 Drawing Sheets

DETECTION CIRCUIT AND WAKE-UP METHOD

CROSS-REFERENCE TO RELATED PATENT APPLICATION

This application claims the benefit of priority to Taiwan Patent Application No. 109134706, filed on Oct. 7, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a detection circuit and a wake-up method, and more particularly to a detection circuit and a wake-up method that are adapted to a high definition multimedia interface (HDMI) receiver that enters a power-saving mode in a fixed-rate link (FRL) mode.

BACKGROUND OF THE DISCLOSURE

A fixed-rate link (FRL) mode is a new transmission mode defined by the HDMI 2.1 specification. Before an HDMI transmitter and an HDMI receiver (i.e., Source and Sink) enter the FRL mode, the HDMI transmitter and the HDMI receiver must perform a link training to confirm a maximum transmission bandwidth between each other. After the link training, the HDMI transmitter and the HDMI receiver can be in a state of the FRL. Moreover, before transmitting video packets, the HDMI transmitter can transmit gap packets beforehand, and after video data is ready, the HDMI transmitter can switch from the gap packets to the video packets. However, the period of time of the transmission of the gap packets is determined by a period of time for the HDMI transmitter to prepare the video data. In addition, in order to not lose the video data, the HDMI receiver can remain in the state of the FRL and await transmission of the video packets by the HDMI transmitter.

In addition, since the gap packets do not contain the video data, when the HDMI receiver has no video to display, the HDMI receiver can also be self-defined to be disconnected from the FRL and enter a power-saving mode after a period of time within which the video packets are not received, so as to avoid unnecessary power consumption. However, the above causes the following issues:

1. When the HDMI transmitter requires too long a period of time to prepare the video data, and the video packets are transmitted when the HDMI receiver is already in the power-saving mode, the HDMI receiver is unable to identify the video packets due to the HDMI receiver being disconnected from the FRL. Therefore, the HDMI receiver loses the video data and is unable to display videos.

2. The HDMI receiver also stops reporting status to the HDMI transmitter in the power-saving mode, such as Status and Control Data Channel (SCDC) and Enhanced Display Identification Data (EDID) updates. Moreover, a hot plug detection (HPD) pin does not drag down an electrical potential because a cable is still connected thereto, which causes the HDMI transmitter to be unable to learn that the HDMI receiver is disconnected from the FRL. Therefore, the HDMI transmitter continues to transmit video packets, and does not conduct the link training again to restart the FRL. Therefore, unless the cable is re-plugged, the HDMI receiver is not able to, even after being woken, receive the video packets and display the videos again, due to a receiving interface circuit thereof being reset to an initial state (i.e., the set parameters are lost). Therefore, the HDMI receiver requires a mechanism that can automatically wake up and display the videos by detecting whether or not the HDMI transmitter has started to transmit the video packets after entering the power-saving mode to overcome the above-mentioned inadequacies.

SUMMARY OF THE DISCLOSURE

In response to the above-referenced technical inadequacies, the present disclosure provides a detection circuit and a wake-up method.

In one aspect, the present disclosure provides a detection circuit adapted to a high definition multimedia interface (HDMI) receiver that enters a power-saving mode in a fixed-rate link (FRL) mode to detect whether or not an HDMI transmitter starts transmitting video packets through an FRL. The detection circuit includes a signal detection circuit and an FRL packet determination circuit. The signal detection circuit detects whether or not a signal exists on the FRL, and an existence of the signal on the FRL indicates an existence of FRL packets on the FRL. The FRL packet determination circuit determines whether or not the FRL packets are the video packets according to at least one of a variable value characteristic of the video packets and a fixed value characteristic of gap packets. In response to the FRL packets not being the video packets, the HDMI receiver remains in the power-saving mode. In response to the FRL packets being the video packets, the FRL packet determination circuit wakes up the HDMI receiver from the power-saving mode to resolve the video packets and display videos.

In another aspect, the present disclosure provides a wake-up method adapted to an HDMI receiver that enters a power-saving mode in an FRL mode. After the HDMI receiver enters the power-saving mode, the HDMI receiver turns off a main circuit thereof that resolves video packets and displays videos. The wake-up method includes: detecting whether or not a signal exists on the FRL via a signal detection circuit, and an existence of the signal on the FRL indicating an existence of FRL packets on the FRL; and determining whether or not the FRL packets are the video packets via an FRL packet determination circuit, according to at least one of a variable value characteristic of the video packets and a fixed value characteristic of gap packets. If the FRL packets are not the video packets, the method returns to the step of detecting whether or not the signal exists on the FRL via the signal detection circuit. If the FRL packets are the video packets, the HDMI receiver is woken up from the power-saving mode, such that the main circuit is turned on to resolve the video packets and display the videos.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
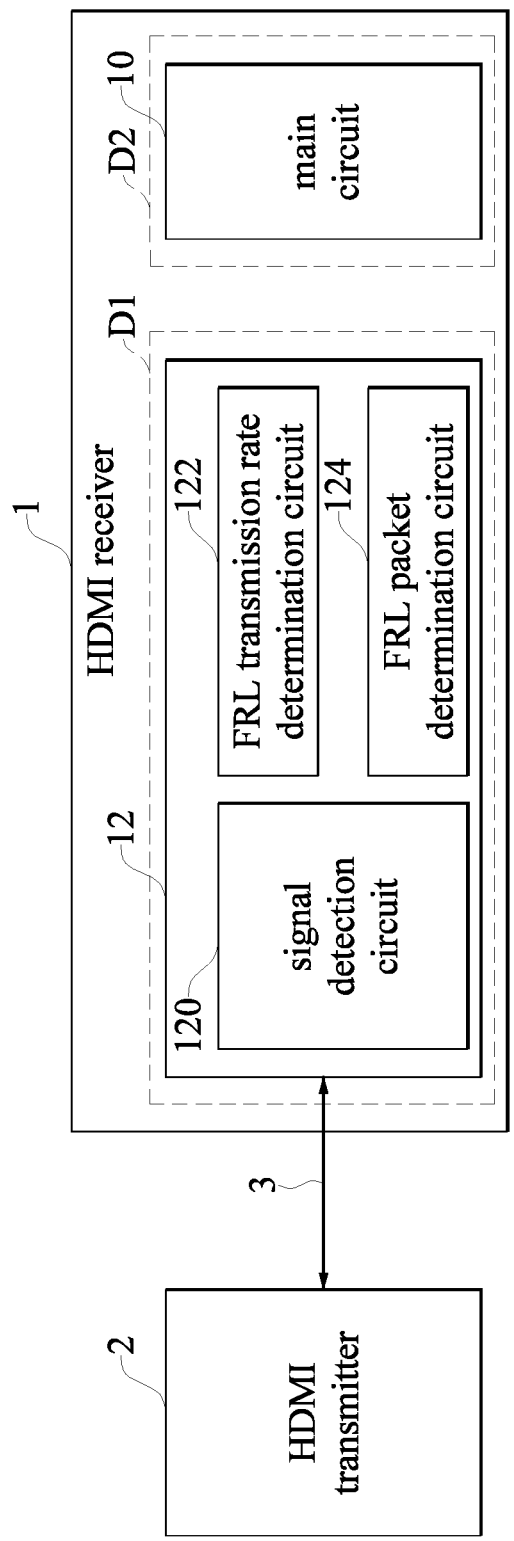
FIG. 1 is a block diagram of a detection circuit in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

It should be noted that the present disclosure does not limit specific conditions of a high definition multimedia interface (HDMI) receiver entering a power-saving mode in a fixed-rate link (FRL) mode. For example, when the HDMI transmitter requires too long of a period of time to prepare video data, the HDMI receiver can enter the power-saving mode. Referring to FIG. 1, FIG. 1 is a block diagram of a detection circuit in one embodiment of the present disclosure. A detection circuit 12 is adapted to an HDMI receiver 1 that enters a power-saving mode in an FRL mode, so as to detect whether or not an HDMI transmitter 2 starts transmitting video packets through an FRL 3 (i.e., a transmission channel). The detection circuit 12 includes a signal detection circuit 120, an FRL packet determination circuit 122, and an FRL transmission rate determination circuit 124.

The signal detection circuit 120, the FRL transmission rate determination circuit 122, and the FRL packet determination circuit 124 can be implemented through pure hardware, or implemented through hardware in cooperation with firmware or software. In addition, the signal detection circuit 120, the FRL transmission rate determination circuit 122, and the FRL packet determination circuit 124 can be disposed separately or in an integrated manner, and the present disclosure does not limit a specific implementation of the detection circuit 12. In this embodiment, the signal detection circuit 120 detects whether or not a signal exists on an FRL 3. An existence of the signal on the FRL 3 indicates that FRL packets are on the FRL 3.

Moreover, the FRL transmission rate determination circuit 122 can determine a transmission rate on the FRL 3 according to a transition density of the aforementioned signal (that can exist on the FRL 3) within a time interval. Since a receiving interface circuit of the HDMI receiver 1 (not shown in FIG. 1) also stops receiving signals and resets to an initial state in the power-saving mode, in order to correctly receive and resolve the signal on the FRL 3, the HDMI receiver 1 is required to reset parameters of the receiving interface circuit according to the transmission rate determined by the FRL transmission rate determination circuit 122 to successfully convert the signal on the FRL 3 into a signal that can be resolved by the HDMI receiver 1.

Furthermore, the FRL packet determination circuit 124 can determine whether or not the FRL packets are video packets according to at least one of a variable value characteristic of the video packets and a fixed value characteristic of gap packets. If the FRL packets are not the video packets, it indicates that the HDMI transmitter 2 is still preparing video data, and that the HDMI receiver 1 remains in the power-saving mode. If the FRL packets are the video packets, it indicates that the HDMI transmitter 2 has started to transmit the video packets through the FRL 3, so that the FRL packet determination circuit 124 wakes up the HDMI receiver 1 from the power-saving mode to resolve the video packets and display videos.

Specifically, the signal detection circuit 120 can periodically detect whether or not the signal exists on the FRL (once every period of time). If the signal exists on the FRL 3, it indicates that the video packets possibly exist on the FRL 3. If the signal is absent from the FRL 3, the HDMI receiver 1 remains in the power-saving mode and awaits another detection of the signal detection circuit 120. In addition, since HDMI is a high-speed differential signal, the signal detection circuit 120 can determine whether or not a magnitude of a differential signal inputted through the FRL 3 exceeds a range between an upper threshold voltage +Vth and a lower threshold voltage −Vth, so as to determine whether or not the signal exists on the FRL 3.

Figure 2:
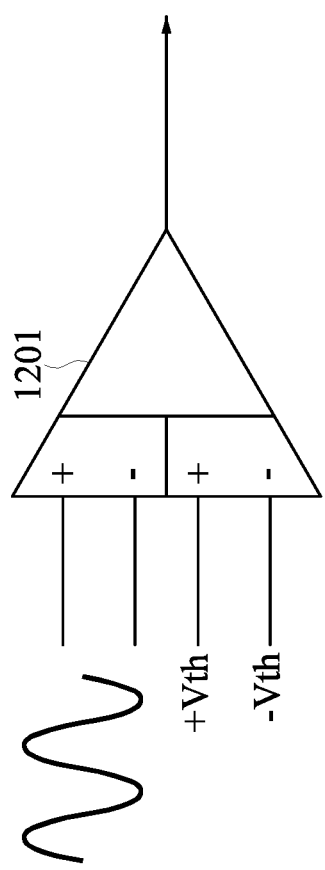
FIG. 2 is a circuit schematic view of a signal detection circuit of the detection circuit shown in FIG. 1.

Referring to FIG. 2, FIG. 2 is a circuit schematic view of the signal detection circuit 120 of the detection circuit 12 shown in FIG. 1. As shown in FIG. 2, the signal detection circuit 120 can include a comparator 1201. A first non-inverting input and a first inverting input of the comparator 1201 receive a differential signal inputted through the FRL 3, and a second non-inverting input and a second inverting input of the comparator 1201 respectively receive the upper threshold voltage +Vth and the lower threshold voltage −Vth, such that the comparator 1201 is able to determine that the signal exists on the FRL 3 when the magnitude of the differential signal is greater than the upper threshold voltage +Vth or smaller than the lower threshold voltage −Vth. In addition, since the transmission rate on the FRL 3 can range from 3 Gbps to 12 Gbps, the HDMI receiver 1 is required to use the FRL transmission rate determination circuit 122 to distinguish the transmission rate on the FRL 3, and the receiving interface circuit of the HDMI receiver 1 can then be set according to the transmission rate, so as to receive data.

Figure 3:
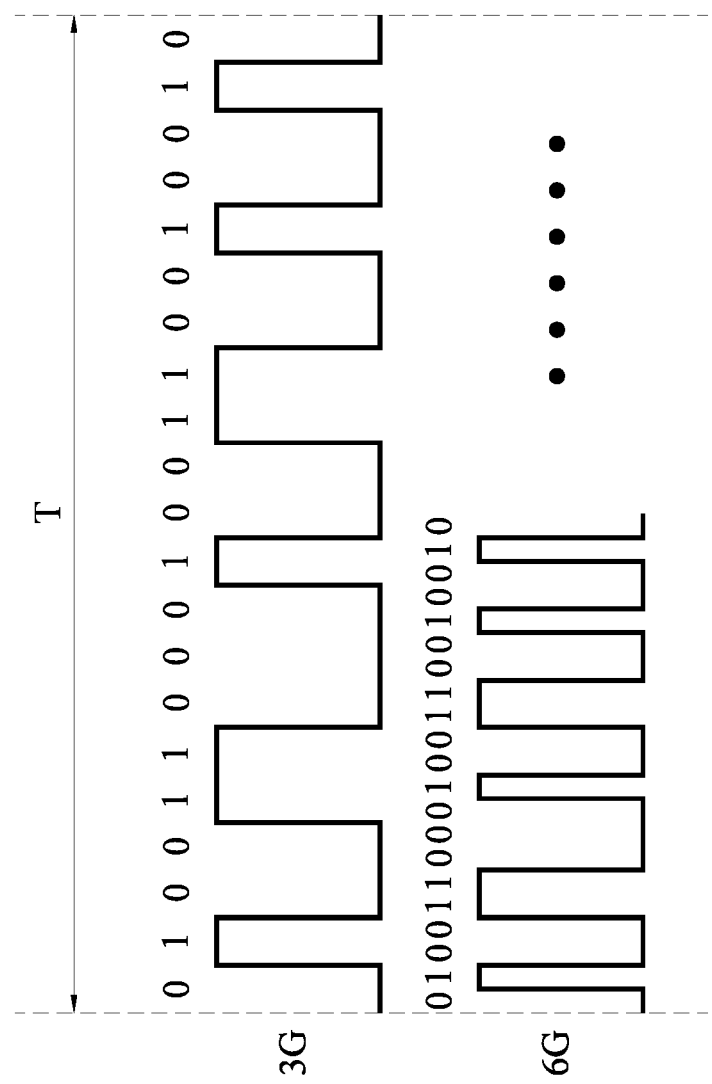
FIG. 3 is a schematic view illustrating a FRL transmission rate determination circuit of the detection circuit shown in FIG. 1 determining a transmission rate according to a transition density of a signal within a time interval.

Referring to FIG. 3, FIG. 3 is a schematic view illustrating the FRL transmission rate determination circuit 122 of the detection circuit 12 shown in FIG. 1 determining a transmission rate according to a transition density of signal within a time interval T. It should be understood that a data encoding method of the FRL packets is 16$b$/18$b$, which converts 16 bits to 18 bits through a lookup table, and the converted 18 bits have DC balance characteristics, that is, the number of zeros and ones are the same. Therefore, in this embodiment, according to the encoding method, it can be inferred that within the same time interval T, a signal with a higher transmission rate has a higher transition density.

For example, in the same time interval T, a number of electrical potential transitions adopting a 6 Gbps signal is twice that of adopting a 3 Gbps signal. Therefore, within the same time interval T, if the FRL transmission rate determination circuit 122 is given that the number of electrical potential transitions adopting a 3 Gbps signal is 12, and the currently calculated number of electrical potential transitions is 24, it indicates that the transmission rate on the FRL 3 is 6 Gbps. The above-mentioned numbers of electrical potential transitions are only examples, and are not meant to limit the present disclosure.

Figure 4:
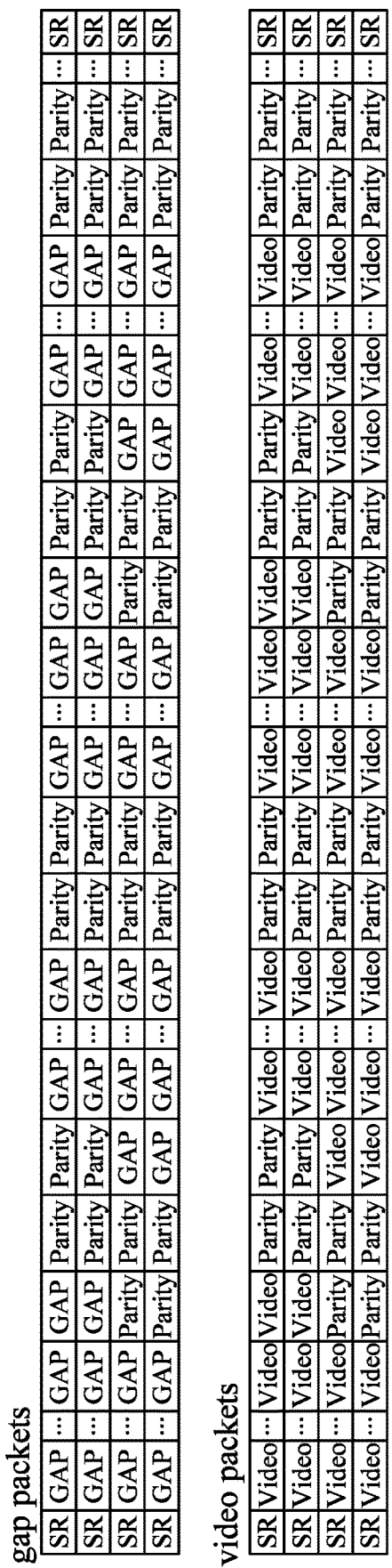
FIG. 4 is a schematic view showing character differences between gap packets and video packets.

In addition, referring to FIG. 4, FIG. 4 is a schematic view showing character differences between the gap packets and the video packets. For the convenience of explanation, the symbols "SR", "GAP", "Video", and 'Parity" are used in FIG. 4 to represent scrambler reset characters, gap characters, video characters, and forward error correction (FEC) check characters, respectively. Moreover, start super block characters and scrambler reset characters are comma characters that can be used to implement character alignment, and "SSB" is used to represent the start super block characters, but only the comma characters are exemplified as "SR" in FIG. 4. According to the HDMI 2.1 specification, the gap packets include three characters: "SR/SSB", "GAP", and "Parity". In addition to the "SR/SSB" and "GAP" characters being fixed values, the check characters calculated by the FEC for the gap characters are also fixed values. In addition, after being scrambled and 16$b$/18$b$ encoded, the three types of characters of the gap packets are converted to fixed values in a fixed cycle. On the contrary, the video characters in the video packets are variable values based on content of the videos, and the check characters calculated by the FEC for the video characters are also variable values, such that the values are still variable values after being scrambled and 16$b$/18$b$ encoded. Therefore, the FRL packet determination circuit 124 can determine whether or not the FRL packets are video packets without resolving the content of the FRL packets through identifying the abovementioned characteristics.

For example, the FRL packet determination circuit 124 can identify whether or not the characters in the current FRL packets are variable values. When the characters are not variable values, the FRL packet determination circuit 124 can determine that the current FRL packets are not the video packets, which allows the HDMI receiver 1 to remain in the power-saving mode. In addition, when the characters are variable values, the FRL packet determination circuit 124 can determine that the current FRL packets are the video packets, the FRL packet determination circuit 124 then wakes up the HDMI receiver 1 to display the videos. In other words, the FRL packet determination circuit 124 can identify whether or not the characters in the current FRL packets are fixed values in a fixed cycle. When the characters are fixed values in a fixed cycle, the FRL packet determination circuit 124 can determine that the current FRL packets are not video packets but gap packets, which allows the HDMI receiver 1 to remain in the power-saving mode. In addition, when the characters are not fixed values in a fixed cycle, the FRL packet determination circuit 124 can determine that the current FRL packets are the video packets, which allows the FRL packet determination circuit 124 to wake up the HDMI receiver 1 to display the videos.

Similarly, the FRL packet determination circuit 124 can identify whether or not the characters in the current FRL packets are variable values or fixed values in a fixed cycle. When the characters are fixed values in a fixed cycle, the FRL packet determination circuit 124 can determine that the current FRL packets are not the video packets but the gap packets, which allows the HDMI receiver 1 to remain in the power-saving mode. In addition, when the characters are variable values, the FRL packet determination circuit 124 can determine that the current FRL packets are the video packets, which allows the FRL packet determination circuit 124 to wake up the HDMI receiver 1 to display the videos. In summary, the present disclosure does not limit the specific implementation of the FRL packet determination circuit 124 to determine whether or not the FRL packet are the video packets according to at least one of the variable value characteristic of the video packets and the fixed value characteristic of the gap packets, and can be designed by a person having ordinary skill in the art according to actual requirements or applications. In addition, since the above-mentioned method for identification only requires a simple numerical verification circuit, an area and a cost required for the FRL packet determination circuit 124 can be greatly reduced, and the power consumption of the detection circuit 12 in the power-saving mode detecting whether or not the HDMI transmitter 2 starts to transmit the video packets through the FRL 3 is also reduced.

However, a main circuit 10 that resolves the video packets and displays the videos in the HDMI receiver 1 can consume up to hundreds of milliwatts of power, and the power consumption of general power-saving modes are required to only be tens of milliwatts. Therefore, after the HDMI receiver 1 enters the power-saving mode, the main circuit 10 is turned off to reduce the power consumption. In addition, in order to be able to detect whether or not the HDMI transmitter 2 starts to transmit the video packets in the power-saving mode without consuming a large amount of the power, the power domain D1 of the detection circuit 12 and the power domain D2 of the main circuit 10 can be further separated from each other in the present disclosure, so that after entering the power-saving mode, the HDMI receiver 1 turns off the power domain D2 of the main circuit 10 to save power, and only the power domain D1 of the detection circuit 12 remains turned on to detect whether or not the HDMI transmitter 2 has started to transmit the video packets through the FRL 3.

Figure 5:
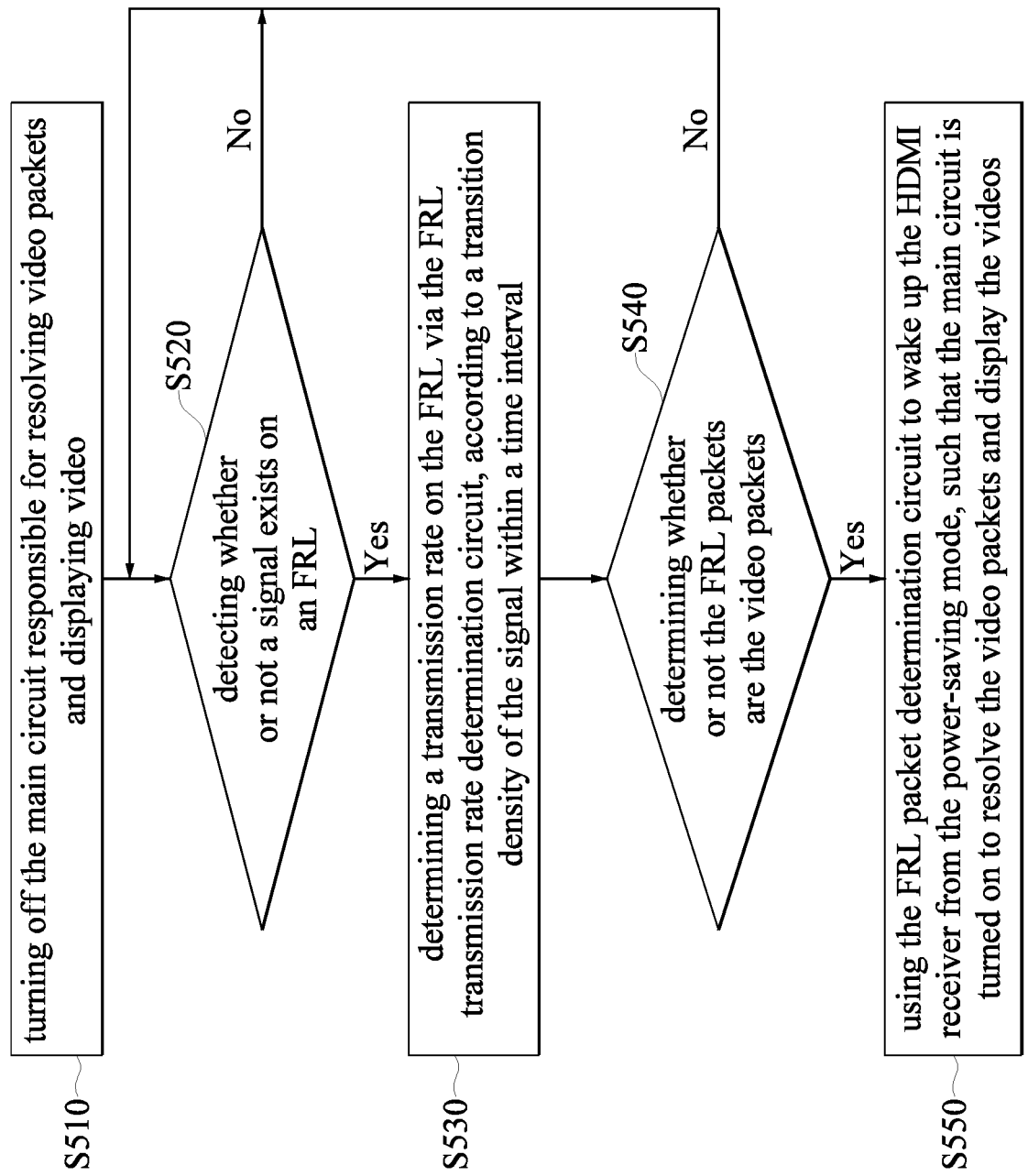
FIG. 5 is a flowchart showing steps of a wake-up method in one embodiment of the present disclosure.

Finally, referring to FIG. 5, FIG. 5 is a flowchart showing steps of a wake-up method in one embodiment of the present disclosure. Since the detailed steps and procedures are already described in the previous embodiments, details thereof will not be reiterated herein. As shown in FIG. 5, after the HDMI receiver 1 enters the power-saving mode in step S510, the HDMI receiver 1 turns off the main circuit 10 thereof, which resolves the video packets and displays the videos, so as to reduce the power consumption. In step S520, the signal detection circuit 120 is utilized to detect whether or not the signal exists on the FRL 3. When no signal exists on the FRL 3, step S520 is returned to. When the signal exists on the FRL 3, it indicates that the FRL packets are on the FRL 3, and the HDMI receiver 1 further performs step S530, utilizing the FRL transmission rate determination circuit 122 to determine the transmission rate on the FRL 3 according to the transition density of the aforementioned signal within the time interval T. In addition, the HDMI receiver 1 is required to reset the parameters of the receiving interface circuit according to the transmission rate determined by the FRL transmission rate determination circuit 122 to successfully convert the signal on the FRL 3 into signal that can be resolved by the HDMI receiver 1.

As mentioned above, since the signal detection circuit 120 can periodically detect whether or not the signal exists on the FRL 3 (once every period of time), when returning to step S520, the HDMI receiver 1 can await another detection of the signal detection circuit 120. Next, in step S540, the FRL packet determination circuit 124 is utilized to determine whether or not the FRL packets are the video packets according to at least one of the variable value characteristic of the video packets and the fixed value characteristic of the gap packets. When the FRL packets are not the video packets, it indicates that the HDMI transmitter 2 is still preparing the video data, and the HDMI receiver 1 can await another detection by the signal detection circuit 120 (return to step S520). When the FRL packets are the video packets, it indicates that the HDMI transmitter 2 has started to transmit the video packets through the FRL 3. Therefore, the HDMI receiver 1 can perform step S550 and utilize the FRL packet determination circuit 124 to wake up the HDMI receiver 1 from the power-saving mode, so that the main circuit 10 is turned on to resolve the video packets and display the videos.

In addition, the present disclosure does not limit the specific conditions of the HDMI receiver 1 entering the power-saving mode in the FRL mode, and the FRL packet determination circuit 124 can also identify the gap packets according to whether or not the characters in the current FRL packets are fixed values in a fixed cycle. Therefore, in other implementations, after the link training, the detection circuit 12 can be further used to identify the gap packets or the video packets. When the gap packets are identified, the HDMI receiver 1 can enter the power-saving mode; when the video packets are identified, the HDMI receiver 1 leaves the power-saving mode, that is, the HDMI receiver 1 can be woken up to resolve the video packets and display the videos. Since details of the detection circuit 12 are already described in the foregoing part of the present disclosure, they will not be iterated herein.

Beneficial Effects of the Embodiment

In conclusion, the detection circuit and the wake-up method are provided in the embodiment of the present disclosure. The detection circuit and the wake-up method are suitable for the HDMI receiver that enters the power-saving mode in the FRL mode, so as to automatically wake up the HDMI receiver through detecting whether or not the HDMI transmitter starts to transmit the video packets. Since the detection circuit and the wake-up method are not overly complex, in addition to reducing the circuit area and the cost, the detection circuit and the wake-up method can also reduce the power consumption, so that when the HDMI receiver enters the power-saving mode, the purpose is not lost.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A detection circuit adapted to a high definition multimedia interface (HDMI) receiver that enters a power-saving mode in a fixed-rate link (FRL) mode to detect whether or not an HDMI transmitter starts transmitting video packets through an FRL, the detection circuit comprising:
   a signal detection circuit detecting whether or not a signal exists on the FRL, and an existence of the signal on the FRL indicating an existence of FRL packets on the FRL; and
   an FRL packet determination circuit determining whether or not the FRL packets are the video packets according to at least one of a variable value characteristic of the video packets and a fixed value characteristic of gap packets;
   wherein, in response to the FRL packets not being the video packets, the HDMI receiver remains in the power-saving mode;
   wherein, in response to the FRL packets being the video packets, the FRL packet determination circuit wakes up the HDMI receiver from the power-saving mode to resolve the video packets and display videos.

2. The detection circuit according to claim 1, further comprising an FRL transmission rate determination circuit determining a transmission rate on the FRL according to a transition density of the signal within a time interval.

3. The detection circuit according to claim 2, wherein the HDMI receiver is further required to reset parameters of a receiving interface circuit thereof according to the transmission rate determined by the FRL transmission rate determination circuit, so as to successfully convert the signal on the FRL to a signal that is resolvable by the HDMI receiver.

4. The detection circuit according to claim 1, wherein the signal detection circuit periodically detects whether or not the signal exists on the FRL; wherein, if the signal exists on the FRL, the video packets possibly exist on the FRL, and if the signal is absent from the FRL, the HDMI receiver remains in the power-saving mode and awaits another detection of the signal detection circuit.

5. The detection circuit according to claim 1, wherein the signal detection circuit decides whether or not the signal exists on the FRL through determining whether or not a magnitude of a differential signal inputted through the FRL exceeds a range between an upper threshold voltage and a lower threshold voltage.

6. The detection circuit according to claim 5, wherein the signal detection circuit further includes: a comparator, a first non-inverting input and a first inverting input of the comparator receiving the differential signal inputted through the FRL, and a second non-inverting input and a second inverting input of the comparator respectively receiving the upper threshold voltage and the lower threshold voltage, so that when the magnitude of the differential signal is greater than the upper threshold voltage or smaller than the lower threshold voltage, the comparator determines that the signal exists on the FRL.

7. The detection circuit according to claim 1, wherein the step of the FRL packet determination circuit determining whether or not the FRL packets are the video packets according to the at least one of the variable value characteristic of the video packets and the fixed value characteristic of the gap packets further includes:
identifying whether or not a plurality of characters in the FRL packets are a plurality of variation values;
determining, when the characters are not the variation values, that the FRL packets are not the video packets by the FRL packet determination circuit; and
determining, when the characters are the variation values, that the FRL packets are the video packets by the FRL packet determination circuit.

8. The detection circuit according to claim 1, wherein the step of the FRL packet determination circuit determining whether or not the FRL packets are the video packets according to the at least one of the variable value characteristic of the video packets and the fixed value characteristic of the gap packets further includes:
identifying whether or not a plurality of characters in the FRL packets are a plurality of fixed values that are in a fixed cycle;
determining, when the characters are the fixed values in the fixed cycle, that the FRL packets are not the video packets by the FRL packet determination circuit; and
determining, when the characters are not the fixed values in the fixed cycle, that the FRL packets are the video packets by the FRL packet determination circuit.

9. The detection circuit according to claim 1, wherein the step of the FRL packet determination circuit determining whether or not the FRL packets are the video packets according to the at least one of the variable value characteristic of the video packets and the fixed value characteristic of the gap packets further includes:
identifying whether or not a plurality of characters in the FRL packets are a plurality of variation values, or a plurality of fixed values that are in a fixed cycle;
determining, when the characters are the fixed values in the fixed cycle, that the FRL packets are not the video packets by the FRL packet determination circuit; and
determining, when the characters are the variation values, that the FRL packets are the video packets by the FRL packet determination circuit.

10. The detection circuit according to claim 1, wherein the HDMI receiver further includes a main circuit resolving the video packets and displaying the videos, and a first power domain of the detection circuit and a second power domain of the main circuit are separate from each other, such that, after entering the power-saving mode, the HDMI receiver turns off the second power domain of the main circuit to reduce power consumption, and only the first power domain of the detection circuit is turned on to detect whether or not the HDMI transmitter starts transmitting the video packets through the FRL.

11. A wake-up method adapted to a high definition multimedia interface (HDMI) receiver that enters a power-saving mode in a fixed-rate link (FRL) mode, wherein after entering the power-saving mode, the HDMI receiver turns off a main circuit thereof that resolves video packets and displays videos, the wake-up method comprising:
detecting whether or not a signal exists on an FRL via a signal detection circuit, and an existence of the signal on the FRL indicating an existence of FRL packets on the FRL; and
determining whether or not the FRL packets are the video packets via an FRL packet determination circuit, according to at least one of a variable value characteristic of the video packets and a fixed value characteristic of gap packets;
wherein, in response to the FRL packets not being the video packets, returning to the step of detecting whether or not the signal exists on the FRL via the signal detection circuit;
wherein, in response to the FRL packets being the video packets, the HDMI receiver wakes up from the power-saving mode, so that the main circuit is turned on to resolve the video packets and display the videos.

12. The wake-up method according to claim 11, further comprising:
determining a transmission rate on the FRL via an FRL transmission rate determination circuit, according to a transition density of the signal within a time interval.

13. The wake-up method according to claim 12, wherein the HDMI receiver is further required to reset parameters of a receiving interface circuit thereof according to the transmission rate determined by the FRL transmission rate determination circuit, so as to successfully convert the signal on the FRL to a signal that is resolvable by the HDMI receiver.

14. The wake-up method according to claim 11, wherein the signal detection circuit periodically detects whether or not the signal exists on the FRL; wherein, if the signal exists on the FRL, the video packets possibly exist on the FRL, and if the signal is absent from the FRL, the HDMI receiver remains in the power-saving mode and awaits another detection of the signal detection circuit.

15. The wake-up method according to claim 11, wherein the signal detection circuit decides whether or not the signal exists on the FRL through determining whether or not a magnitude of a differential signal inputted through the FRL exceeds a range between an upper threshold voltage and a lower threshold voltage.

16. The wake-up method according to claim 15, wherein the signal detection circuit further includes: a comparator, a first non-inverting input and a first inverting input of the comparator receiving the differential signal inputted through the FRL, and a second non-inverting input and a second inverting input of the comparator respectively receiving the upper threshold voltage and the lower threshold voltage, so that when the magnitude of the differential signal is greater than the upper threshold voltage or smaller than the lower threshold voltage, the comparator determines that the signal exists on the FRL.

17. The wake-up method according to claim 11, wherein the step of determining whether or not the FRL packets are the video packets via the FRL packet determination circuit, according to the at least one of the variable value characteristic of the video packets and the fixed value characteristic of the gap packets further includes:
identifying, by the FRL packet determination circuit, whether or not a plurality of characters in the FRL packets are a plurality of variation values;
determining, when the characters are not the variation values, that the FRL packets are not the video packets by the FRL packet determination circuit; and
determining, when the characters are the variation values, that the FRL packets are the video packets by the FRL packet determination circuit.

18. The wake-up method according to claim 11, wherein the step of determining whether or not the FRL packets are the video packets via the FRL packet determination circuit, according to the at least one of the variable value characteristic of the video packets and the fixed value characteristic of the gap packets further includes:
- identifying, by the FRL packet determination circuit, whether or not a plurality of characters in the FRL packets are a plurality of fixed values that are in a fixed cycle;
- determining, when the characters are the fixed values in the fixed cycle, that the FRL packets are not the video packets by the FRL packet determination circuit; and
- determining, when the characters are not the fixed values in the fixed cycle, that the FRL packets are the video packets by the FRL packet determination circuit.

19. The wake-up method according to claim 11, wherein the step of determining whether or not the FRL packets are the video packets via the FRL packet determination circuit, according to the at least one of the variable value characteristic of the video packets and the fixed value characteristic of the gap packets further includes:
- identifying, by the FRL packet determination circuit, whether or not a plurality of characters in the FRL packets are a plurality of variation values, or a plurality of fixed values that are in a fixed cycle;
- determining, when the characters are the fixed values in the fixed cycle, that the FRL packets are not the video packets by the FRL packet determination circuit; and
- determining, when the characters are the variation values, that the FRL packets are the video packets by the FRL packet determination circuit.

20. The wake-up method according to claim 11, wherein a first power domain of the detection circuit and a second power domain of the main circuit are separate from each other, such that, after entering the power-saving mode, the HDMI receiver turns off the second power domain of the main circuit to reduce power consumption, and only the first power domain of the detection circuit is turned on to detect whether or not an HDMI transmitter starts transmitting the video packets through the FRL.

* * * * *